(12) United States Patent
Richardson

(10) Patent No.: US 6,295,917 B1
(45) Date of Patent: Oct. 2, 2001

(54) LOST MOTION CYLINDER

(76) Inventor: Curt D. Richardson, 3441 Granite Ave., Lake City, IA (US) 51449

( * ) Notice: Subject to any disclaimer, the term of this patent is extended or adjusted under 35 U.S.C. 154(b) by 0 days.

(21) Appl. No.: 09/478,676

(22) Filed: Jan. 6, 2000

Related U.S. Application Data

(60) Provisional application No. 60/125,943, filed on Mar. 24, 1999.

(51) Int. Cl.[7] .............................. F15B 15/22; F15B 11/08
(52) U.S. Cl. ................................. 91/405; 91/440
(58) Field of Search ............................. 91/404, 405, 436, 91/437, 440

(56) References Cited

U.S. PATENT DOCUMENTS

| 3,071,926 | * | 1/1963 | Olson et al. ........................ 91/420 |
| 3,916,768 | * | 11/1975 | Martin ............................... 91/436 X |
| 4,147,325 | * | 4/1979 | McGee .............................. 91/437 X |
| 5,415,076 | * | 5/1995 | Krone et al. ....................... 91/436 X |

FOREIGN PATENT DOCUMENTS

| 1166004 | * | 2/1954 | (DE) ..................................... 91/437 |
| 2908583 | * | 9/1980 | (DE) ..................................... 91/405 |
| 2079378 | * | 1/1982 | (GB) ..................................... 91/437 |
| 59-47511 | * | 3/1984 | (JP) ...................................... 91/436 |
| 827861 | * | 5/1981 | (RU) ..................................... 91/437 |

* cited by examiner

*Primary Examiner*—John E. Ryznic
(74) *Attorney, Agent, or Firm*—Zarley, McKee, Thomte, Voorhees & Sease

(57) ABSTRACT

A lost motion cylinder has a hydraulic cylinder having a moving piston therein wherein the piston head divides the cylinder into first and second compartments; a first conduit connected to the second compartment of the cylinder to deliver a flow of lubrication oil therein; a second conduit connected to the upper portion of the cylinder to return oil therein to a reservoir; a third conduit interconnecting the first and second conduits; a first check valve in the first conduit to permit oil to flow only towards the cylinder; a second check valve in the third conduit only to permit oil to flow from the second conduit to the first conduit; and an adjustable flow control element in the second conduit whereby the flow of oil from the cylinder to a reservoir can be selectively adjusted wherein trapped oil in the second conduit will cushion the cylinder on the upward stroke of the piston; and trapped oil in the first and second conduits will cushion the cylinder on the downward stroke of the piston.

4 Claims, 1 Drawing Sheet

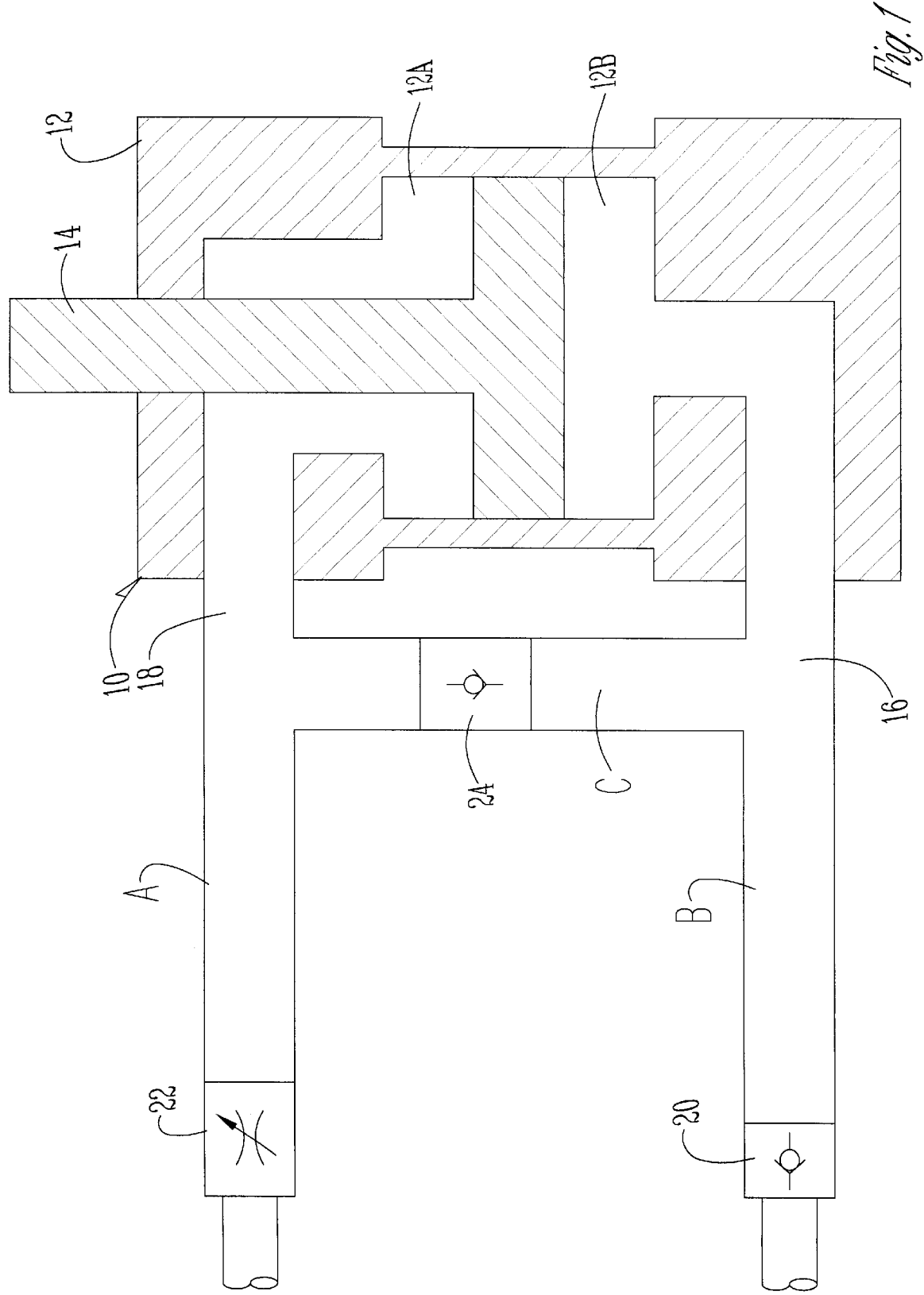

LOST MOTION CYLINDER

CROSS REFERENCE TO A RELATED APPLICATION

This application is based upon the Applicant's Provisional application Ser. No. 60/125,943 filed Mar. 24, 1999.

BACKGROUND OF THE INVENTION

A connecting rod, or lost motion cylinder, is a hydraulic cylinder used in a mechanical drive system. It replaces a cam and a cam follower. The cylinder has no hydraulic pressure applied to it, but uses return hydraulic oil as lubrication, and is mechanically operated. The greatest problem with such a cylinder moving back and forth and not being under pressure but being driven mechanically is that it will destroy itself quickly by banging hard each time the cylinder advances or retracts.

Some efforts have been made to "cushion" the cylinder by trapping oil inside and by having the end of the stroke trap oil in the cylinder and then bleed it out through a needle valve. This system is very expensive to fabricate.

It is therefore a principal object of this invention to provide for the cushioning of a lost motion cylinder which is relatively inexpensive to install, fabricate, and to replace if necessary.

A further object of this invention is to provide a flow control element to restrict the amount of oil flowing in the hydraulic return line to provide the cushioning effect for the lost motion cylinder.

These and other objects will be apparent to those skilled in the art.

SUMMARY OF THE INVENTION

A flow control element is installed in the hydraulic return line from the lost motion cylinder which can be adjusted to provide the desired amount of cushion within the cylinder and to prevent the cylinder from disintegrating through continued usage.

BRIEF DESCRIPTION OF THE DRAWING

FIG. 1 is a schematic diagram depicting the lost motion cylinder of the present invention, with the hydraulic cylinder shown in cross-section.

DESCRIPTION OF THE PREFERRED EMBODIMENT

With reference to the enclosed drawing, a lost motion cylinder 10 has a cylindrical housing 12 and a conventional recipricating piston 14. The piston is attached to a mechanical drive (not shown).

The cylinder housing 12 has an oil inlet port 16 and an oil outlet port 18. Oil is provided to ports 16 through conduit B. Conduit A is connected to port 18, and conduits A and B are interconnected by conduit C. A check valve 20 is imposed in conduit B and an adjustable flow control valve or orfice 22 is imposed in conduit A. A check valve 24 is imposed in conduit C. The upper part of the interior of the cylinder 12 is designated by the numeral 12A, and the lower part is designated by the numeral 12B.

The check valve 20 permits oil to flow only towards the cylinder through conduit B; the check valve 24 permits the oil to flow only upwardly in the conduit C, and the adjustable flow control element 22 permits oil to flow outwardly through conduit A through a restricted passageway in the adjustable flow control 22 to the oil tank or reservoir (not shown). Flow control 22 can be fixed or adjustable as is common in the hydraulic art. A ⅜" diameter conduit A will typically have its flow path reduced to ⅛ or 3/16" in diameter by 22.

Trapped oil in conduit A will cushion the cylinder 12 on the upward stroke of piston 14. Trapped oil in conduits A and B will cushion the cylinder upon the downward stroke of piston 14. The adjustable flow control element 22 will be adjusted to accommodate high volume of return oil, but the extra oil added by the moving piston will build pressure and cushion the cylinder.

The essence of the invention is the flow control element 22 in the conduit A to restrict the amount of oil flowing therein towards the tank. The movement of the piston 14 in the cylinder 12 pushes extra oil into the hydraulic conduit A where it cannot flow freely because of the flow control restriction of element 22. This causes pressure to build up in the hydraulic line and in the cylinder, and this creates the desired "cushion" effect.

This system merely involves the introduction of the flow control element 22 in the return oil conduit A as compared to a complex system of needle valves in a cylinder which heretofore has been the very expensive way of dealing with the same problem.

From the foregoing, it is seen that this invention accomplishes at least its stated objectives.

What is claimed is:

1. A lost motion cylinder having a hydraulic circuit with a single fluid inlet and a single fluid outlet, and a cylinder therein containing a reciprocating mechanically driven piston, and a one-way fluid valve permitting only inlet fluid to flow through the circuit, and a one-way valve between the inlet and outlet to permit fluid to flow only in one direction from the inlet to the outlet, the invention comprising:

an adjustable flow control element whereby the flow of oil from the cylinder to a reservoir can be selectively adjusted wherein trapped oil upstream of the adjustable flow control element will cushion the cylinder during stroke of the piston in one direction and whereby trapped oil will cushion the cylinder during the stroke of the piston in a second opposite direction;

whereupon the fluid in the circuit serves only to cushion the piston in the cylinder and does not apply independent hydraulic power to move and control the reciprocating speed of the piston.

2. The lost motion cylinder of claim 1 wherein the adjustable flow control element is a variable orifice.

3. A lost motion cylinder comprising, a hydraulic cylinder having a mechanically driven moving piston therein, the piston having a piston head that divides the cylinder into first and second compartments, a first conduit connected to the second compartment of the cylinder to deliver a flow of lubrication oil therein, a second conduit connected to the upper portion of the cylinder to return oil therein to a reservoir, a single third conduit directly interconnecting the first and second conduits, a first check valve in the first conduit to permit oil to flow only towards the cylinder, a second check valve disposed in the third conduit to permit oil to flow only from the second conduit to the first conduit, and an adjustable flow control element in the second conduit whereby the flow of oil from the cylinder to a reservoir can be selectively adjusted wherein trapped oil in the second conduit will cushion the cylinder on the upward stroke of the piston, and trapped oil in the first and second conduits will cushion the cylinder on the downward stroke of the piston.

4. A lost motion cylinder comprising, a hydraulic cylinder having a mechanically driven moving piston therein, the piston having a piston head that divides the cylinder into first and second compartments, a first conduit connected to the second compartment of the cylinder to deliver a flow of lubrication oil therein, a second conduit connected to the upper portion of the cylinder to return oil therein to a reservoir, a single third conduit directly interconnecting the first and second conduits, a first check valve in the first conduit to permit oil to flow only towards the cylinder, a second check valve disposed in the third conduit to permit oil to flow only from the second conduit to the first conduit, and a flow control element in the second conduit whereby the flow of oil from the cylinder to a reservoir will be diminished wherein trapped oil in the second conduit will cushion the cylinder on the upward stroke of the piston, and trapped oil in the first and second conduits will cushion the cylinder on the downward stroke of the piston.

* * * * *